(12) United States Patent
Mondal et al.

(10) Patent No.: US 11,397,755 B2
(45) Date of Patent: Jul. 26, 2022

(54) INCREMENTAL CLUSTERING

(71) Applicant: Freshworks Inc., San Mateo, CA (US)

(72) Inventors: Amritendu Mondal, Chennai (IN); Tarkeshwar Thakur, Chennai (IN)

(73) Assignee: Freshworks, Inc., San Mateo, CA (US)

( * ) Notice: Subject to any disclaimer, the term of this patent is extended or adjusted under 35 U.S.C. 154(b) by 322 days.

(21) Appl. No.: 16/854,407

(22) Filed: Apr. 21, 2020

(65) Prior Publication Data

US 2021/0326362 A1 Oct. 21, 2021

(51) Int. Cl.
*G06F 16/28* (2019.01)
*G06F 9/54* (2006.01)
*G06N 20/00* (2019.01)

(52) U.S. Cl.
CPC .......... *G06F 16/285* (2019.01); *G06F 9/546* (2013.01); *G06N 20/00* (2019.01)

(58) Field of Classification Search
CPC ........ G06F 16/285; G06F 9/546; G06N 20/00
USPC .......................................................... 706/12
See application file for complete search history.

(56) References Cited

U.S. PATENT DOCUMENTS

| | | | |
|---|---|---|---|
| 2010/0312769 A1* | 12/2010 | Bailey ..................... | H04L 51/52 707/769 |
| 2013/0232263 A1* | 9/2013 | Kelly ..................... | G06Q 10/10 709/224 |
| 2020/0342462 A1* | 10/2020 | Todd ..................... | G06Q 10/105 |
| 2020/0364511 A1* | 11/2020 | Brown .................. | G06K 9/6263 |
| 2021/0067470 A1* | 3/2021 | Freed ................... | G06K 9/6218 |
| 2021/0097140 A1* | 4/2021 | Chatterjee .............. | G06N 3/049 |

* cited by examiner

*Primary Examiner* — Binh Kien Tieu
(74) *Attorney, Agent, or Firm* — LeonardPatel PC; Sheetal S. Patel; Michael A. Leonard, II

(57) ABSTRACT

Incremental clustering of similar or related messages that otherwise requires limited use of memory for the purpose of increasing scalability. Incremental clustering includes receiving, by a machine learning (ML) engine, an incoming message from an application programming interface (API) server, and scanning, by the ML engine, a plurality of clusters for one or more messages similar to that of the incoming message. Incremental clustering also includes identifying, by a clustering engine, a cluster from the plurality of clusters. The identified cluster includes the one or more messages similar to that of the incoming message. Incremental clustering further includes assigning, by the clustering engine, the incoming message to the identified cluster.

17 Claims, 8 Drawing Sheets

Q1. how to send 10000 email at once?
Q2. How to send bulk email ?
Q3. I forgot my password.
Q4. How can I login?
Q5. Can I buy a movie ticket in Freshdesk ?
Q6. Emails going to Spam C1. Cluster One
C2. Cluster Two
C3. Cluster Three
C4. Cluster Four

Q1. how to send 10000 email at once?
Q2. How to send bulk email ?
Q3. I forgot my password.
Q4. How can I login?
Q5. Can I buy a movie ticket in Freshdesk ?
Q6. Emails going to Spam
Q7. I am not getting support activation email C1. Cluster One
C2. Cluster Two
C3. Cluster Three
C4. Cluster Four
C5. Cluster Five

Fig. 2C
200C

Q1. how to send 10000 email at once?
Q2. How to send bulk email ?
Q3. I forgot my password.
Q4. How can I login?
Q5. Can I buy a movie ticket in Freshdesk ?
Q6. Emails going to Spam
Q7. I am not getting support activation email
Q8. Why most of my emails going to spam ?

C1. Cluster One
C2. Cluster Two
C3. Cluster Three
C4. Cluster Four
C5. Cluster Five

INCREMENTAL CLUSTERING

FIELD

The present invention relates to clustering and, more particularly, to incremental clustering of similar or related questions requiring limited memory for scalability purposes.

BACKGROUND

With question answering (QA) services, each interaction is different. For example, a user on a computing device may submit a question via a messaging application to which a response is given by a BOT. In another example, a caller may dial into a service and submit his or her questions to which a response is given by a BOT. In either case, the questions may be related or unrelated.

For the BOT to quickly respond with an answer message, then BOT must first identify questions that are similar and then respond with the answer message. However, the underlying task of identifying an answer for questions that are similar is difficult. In fact, the task of identifying similar questions requires precision.

Accordingly, clustering questions that are similar may be beneficial to automate responses to questions submitted by a user or a caller.

SUMMARY

Certain embodiments of the present invention may provide solutions to the problems and needs in the art that have not yet been fully identified, appreciated, or solved by current messaging or dial-in service platforms. For example, some embodiments of the present invention pertain to incremental clustering of similar or related messages that otherwise requires limited use of memory for the purpose of increasing scalability.

In an embodiment, a computer-implemented method for clustering incoming messages includes receiving, by a machine learning (ML) engine, an incoming message from an application programming interface (API) server, and scanning, by the ML engine, a plurality of clusters for one or more messages similar to that of the incoming message. The method also includes identifying, by a clustering engine, a cluster from the plurality of clusters. The identified cluster includes the one or more messages similar to that of the incoming message. The method further includes assigning, by the clustering engine, the incoming message to the identified cluster.

In another embodiment, an apparatus is configured to cluster incoming messages. The apparatus includes at least one processor and a set of instructions. The set of instructions are configured to cause the at least one processor to execute receiving, by a ML engine, an incoming message from an API server, and scanning, by the ML engine, a plurality of clusters for one or more messages similar to that of the incoming message. The set of instructions are further configured to cause at least one processor to execute identifying, by a clustering engine, a cluster from the plurality of clusters, and assigning, by the clustering engine, the incoming message to the identified cluster. The identified cluster includes the one or more messages similar to that of the incoming message.

In yet another embodiment, a system configured to cluster incoming messages includes an API server configured to receive an incoming message from one or more service application, and route the incoming message for clustering. The system also includes a ML module configured to receive the incoming message from the API server, and scan a plurality of clusters for one or more messages similar to that of the incoming message. The system further includes a clustering module configured to identify a cluster from the plurality of clusters, and assign the incoming message to the identified cluster. The identified cluster includes the one or more messages similar to that of the incoming message

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
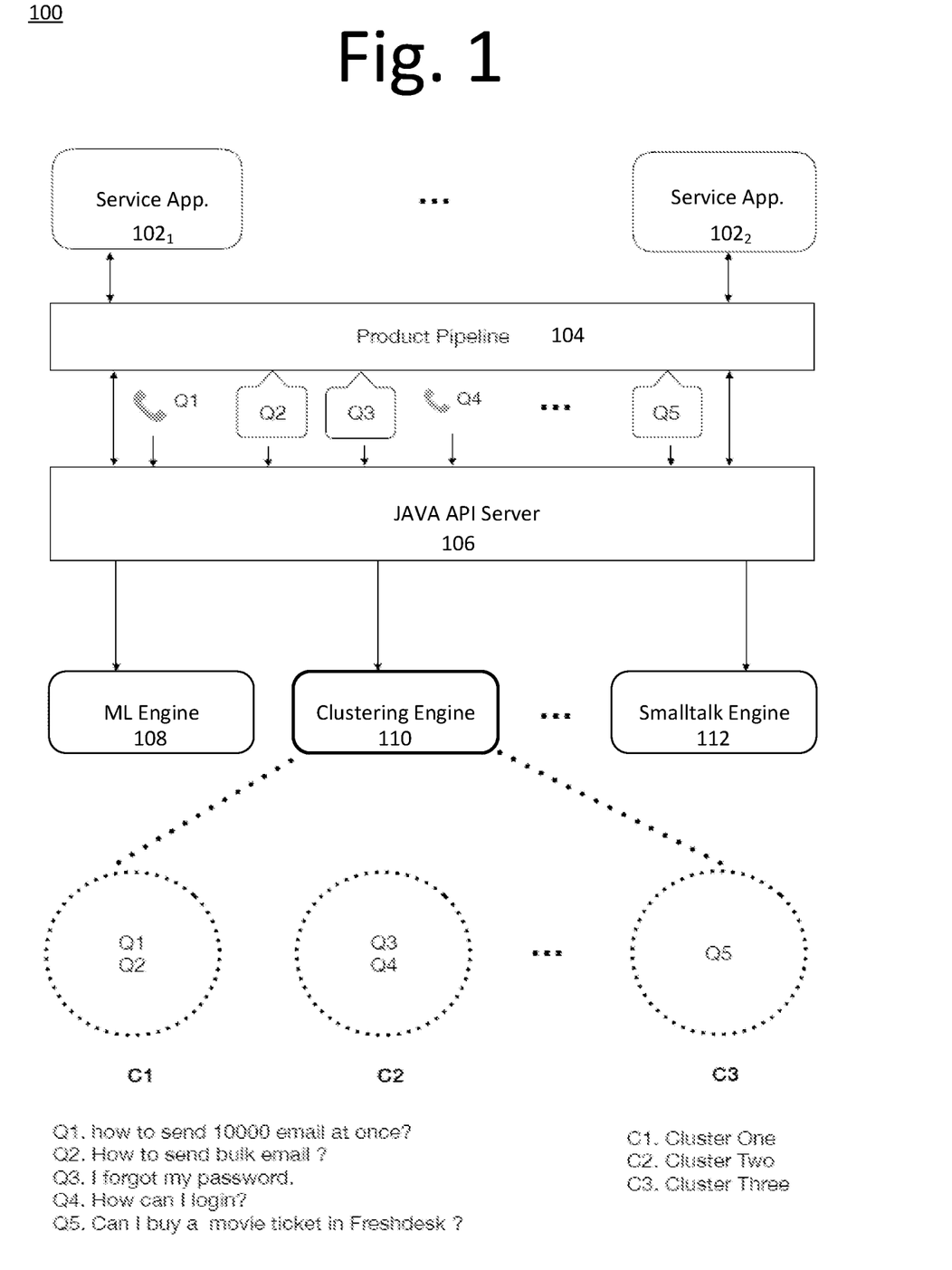
FIG. 1 is a network architecture illustrating a system for clustering one or more messages, according to an embodiment of the present invention.

FIG. 1 is a network architecture illustrating a system 100 for clustering one or more messages, according to an embodiment of the present invention. Messages for purposes of the embodiments described herein may be defined as questions, statements, queries, and the like.

In some embodiments, an end user may communicate with a BOT by way of service applications (e.g., Freshdesk® and Freshservice®) 102₁, 102₂. In these embodiments, the end user (not shown) may communicate by a messaging application. This messaging application may be executed on the user's computing device (also not shown). In an alternative embodiment, the message may be communicated via electronic mail (e-mail).

In certain embodiments, these messages are received by a product pipeline 104, and are forwarded to a BOT for a response. See Q2, Q3, Q4 in FIG. 1.

In another embodiment, a caller using his or her mobile device may dial into a service application, such as Freshcaller®, for submission of a message. See Q1 and Q4 in FIG. 1. In this embodiment, the caller is also submitting his or her message to a BOT for a response. For purposes of explanation, when a caller uses a service like Freshcaller®, the caller's message, which is spoken, is converted over to text.

Regardless of the means to deliver the messages, a ML API server 106, which is a product-facing server written in Java®, receives the messages. ML API server 106 may route those messages to the appropriate engine such as ML engine 108, clustering engine 110, and Smalltalk™ engine 112. Engine may be defined as a server or a module that is embodied on one or more servers. These servers may be part of the ML API server 106 or may be part of one or more different servers.

It should be appreciated that ML engine 108 and Smalltalk™ engine 112 are parallel services that perform separate functions. For example, ML engine 108 fetches answers to messages that the user is looking for, and Smalltalk™ engine 112 detects when the user is entering any small talk. When the user enters into small talk, then Smalltalk™ engine 112 begins communication with the user. Smalltalk™ engine 112 in some embodiments is configured to detect when a message received is a small talk, and if so, responds with one or more short messages.

Stated another way, ML API server 106 may communicate with service applications $102_1$ and $102_2$ via product pipeline 104 or with the caller via Freshcaller®, and route messages received therefrom to the appropriate engine. In one example, when ML API server 104 receives a message from service application $102_1$ or $102_2$, or from Freshcaller®, ML API server 104 assigns the message into one of clusters C1, C2, or C3. In order to assign the message to one of clusters C1, C2, or C3, the message is route to ML engine 108 and/or clustering engine 110. Although three clusters are shown in FIG. 1, the embodiments are not limited to those three clusters.

In some embodiments, cluster C1 contains Q1 "how to send 10000 emails at once?" and Q2 "how to send bulk emails", both of which are related to each other. Cluster C2 contains Q3 "I forgot my password." and Q4 "How can I login?", both of which are also related to each other. Finally, cluster C3 contains "Can I buy a movie ticket in Freshdesk?".

As can be seen from FIG. 1, the messages (e.g., questions) are clustered, i.e., the similar messages are grouped together. For purposes of explanation, similar messages may be defined as messages that share similar attributes or features. Similar attributes or features may be defined as messages that are related, e.g., messages that have similar questions or statements. By grouping similar messages into a cluster, the BOT may populate a general answer to these messages very quickly.

Figure 2A:
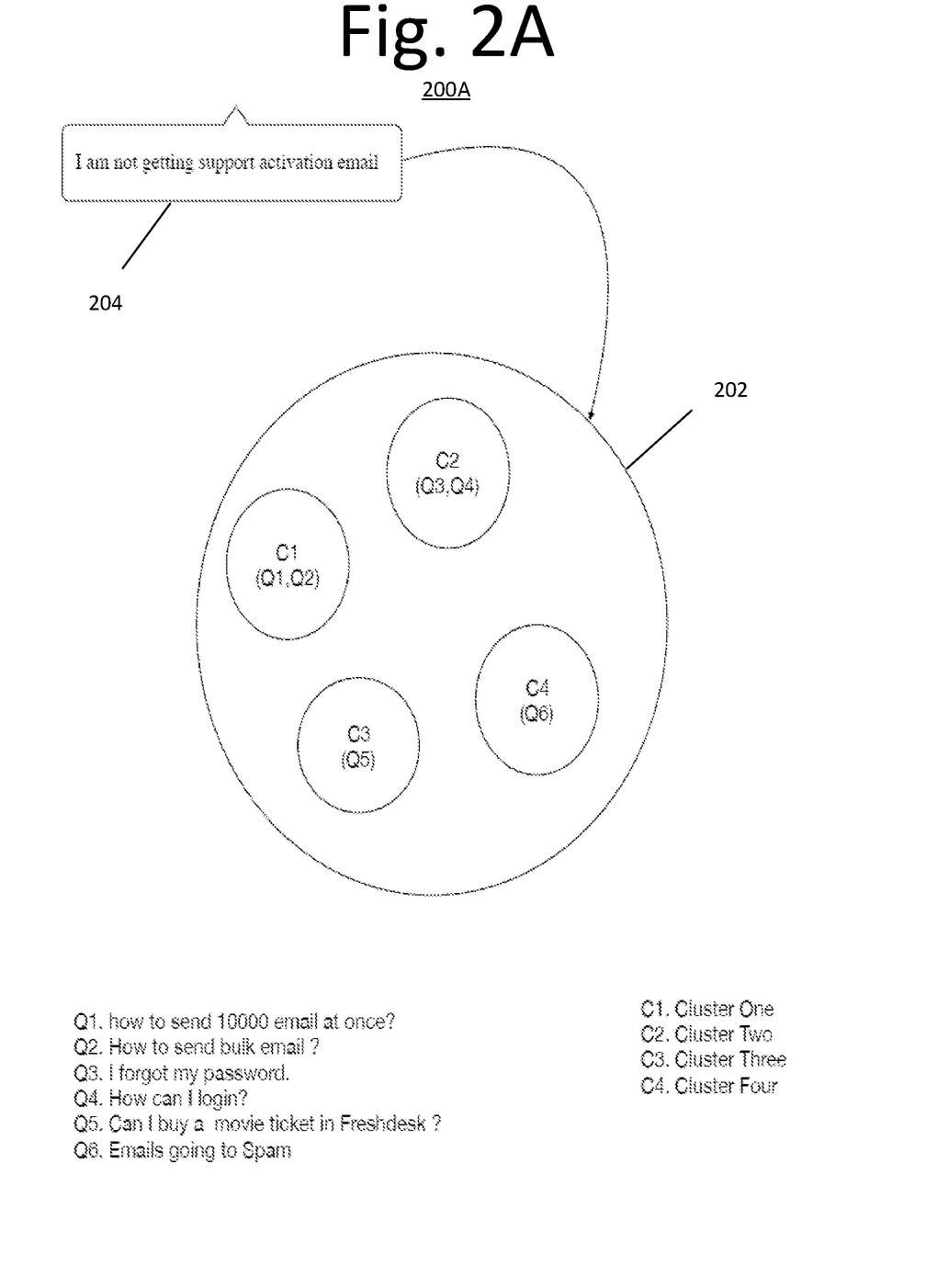
FIG. 2A is a diagram illustrating a message being introduced into a master cluster database by way of clustering, according to an embodiment of the present invention.

FIG. 2A is a diagram 200A illustrating a message 202 being introduced into a master cluster database 202 by way of clustering, according to an embodiment of the present invention. In this embodiment, database 202 includes a plurality of clusters C1, C2, C3, C4, all of which contain one or more related messages. See Q1, Q2, Q3, Q4, Q5, Q6 of FIG. 2A. When a new message 204 is received, clustering engine 110 of FIG. 1 may determine whether to assign new message 204 to a new cluster or to an existing cluster.

Figure 2B:
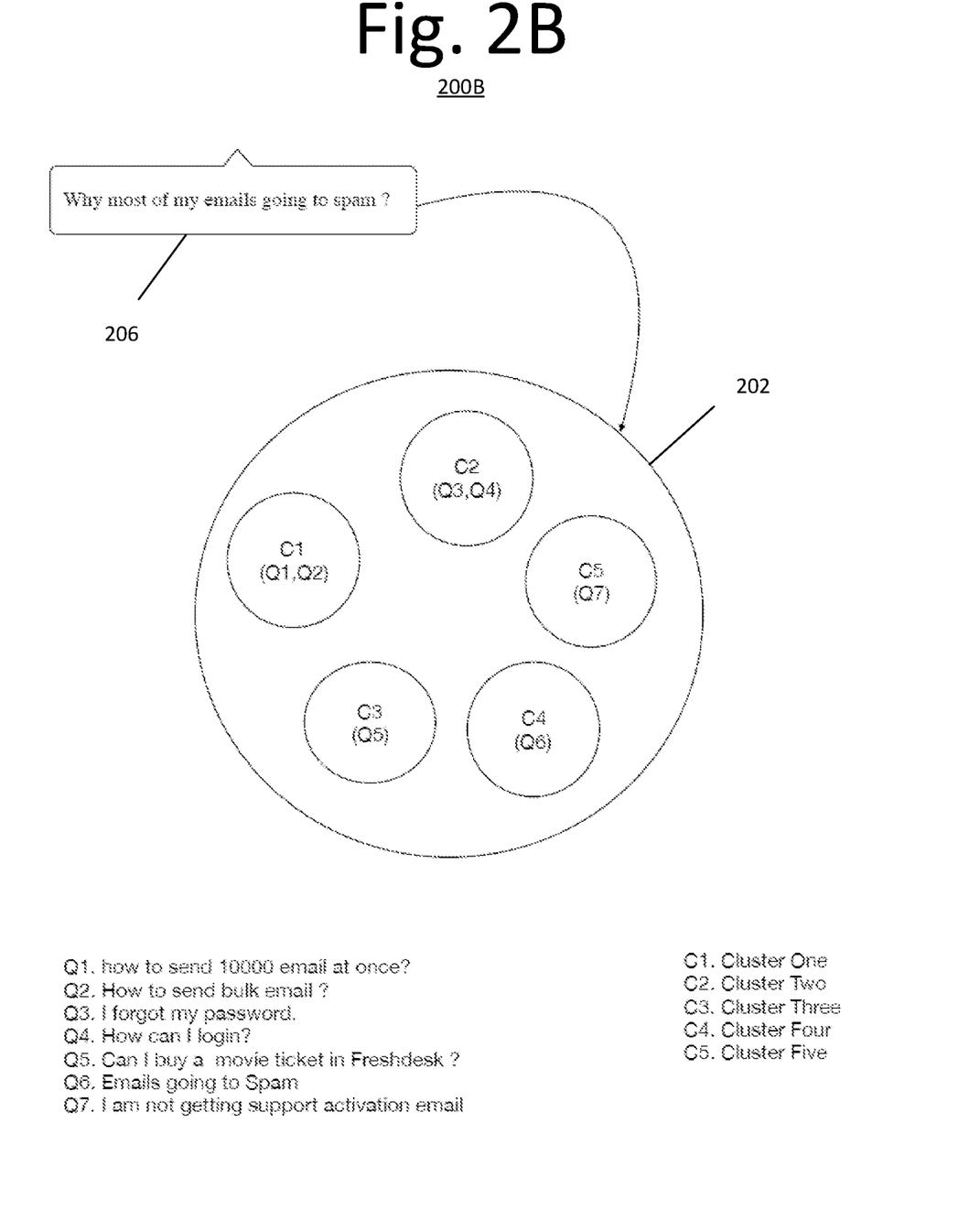
FIG. 2B is a diagram illustrating a new message being introduced into master cluster database by way of clustering, according to an embodiment of the present invention.

In this example, since message 204 is not related to any message Q1 . . . Q6 in any clusters C1 . . . C4, a new cluster C5 is created and a new message identifier Q7 is assigned to message 202. See, for example, FIG. 2B, which is a diagram 200B illustrating a new message 206 being introduced into master cluster database 200 by way of clustering, according to an embodiment of the present invention. In FIG. 2B, diagram 200B shows cluster C5, which contains message Q7.

Figure 2C:
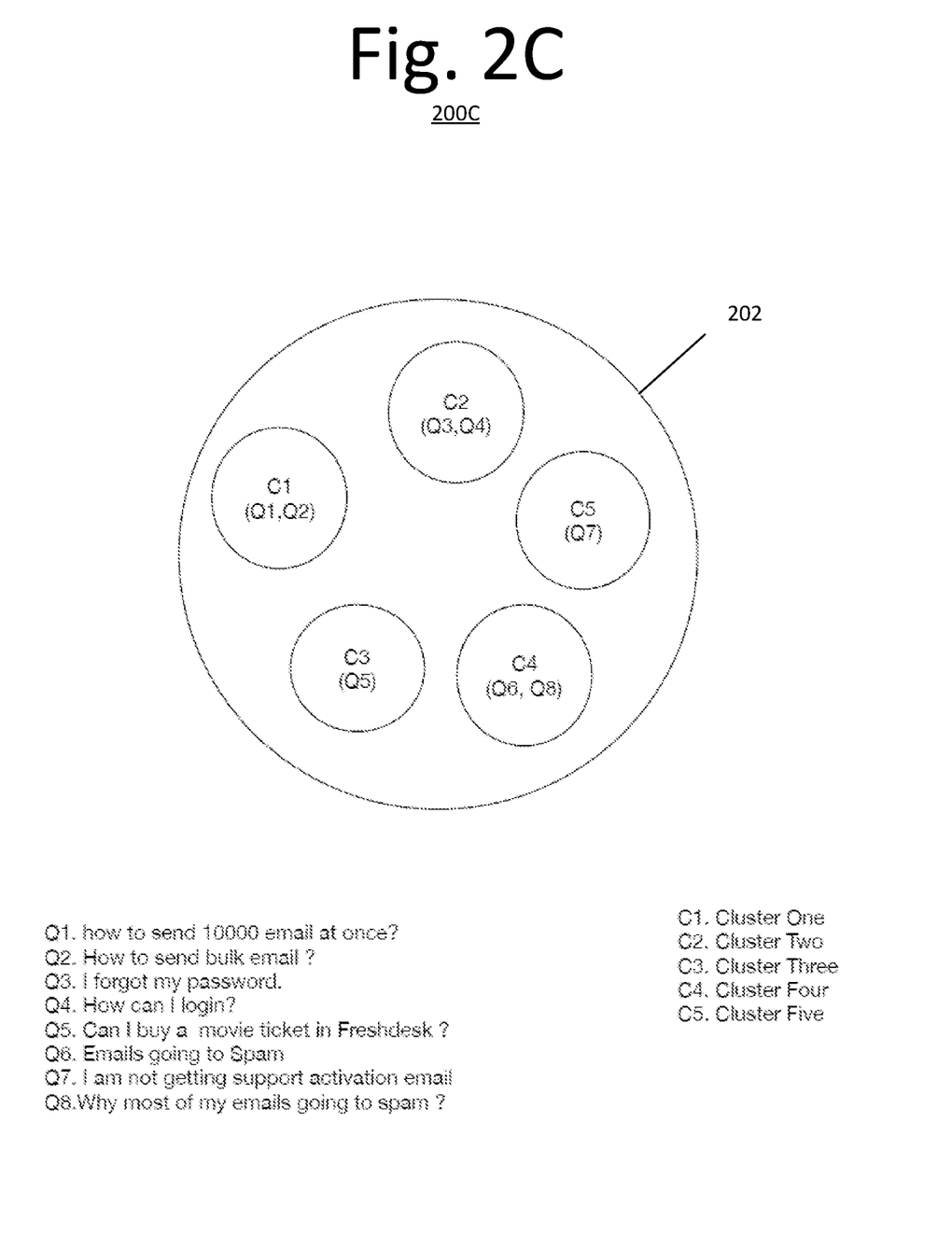
FIG. 2C is a diagram illustrating the insertion of new message into cluster, according to an embodiment of the present invention.

Also, in FIG. 2B, a new message ("Why most of my emails going to spam?") 206 is received at clustering engine. Clustering engine determines whether to assign new message 206 to a new cluster or to an existing cluster. In this embodiment, new message 206 is similar to Q6 ("Emails going to Spam"), which is assigned to cluster C4. Since new message 206 and Q6 are related messages, new message 206 is assigned to cluster C4. See, for example, FIG. 2C, which is a diagram 200C illustrating the insertion of new message 206 into cluster C4, according to an embodiment of the present invention.

Figure 3:
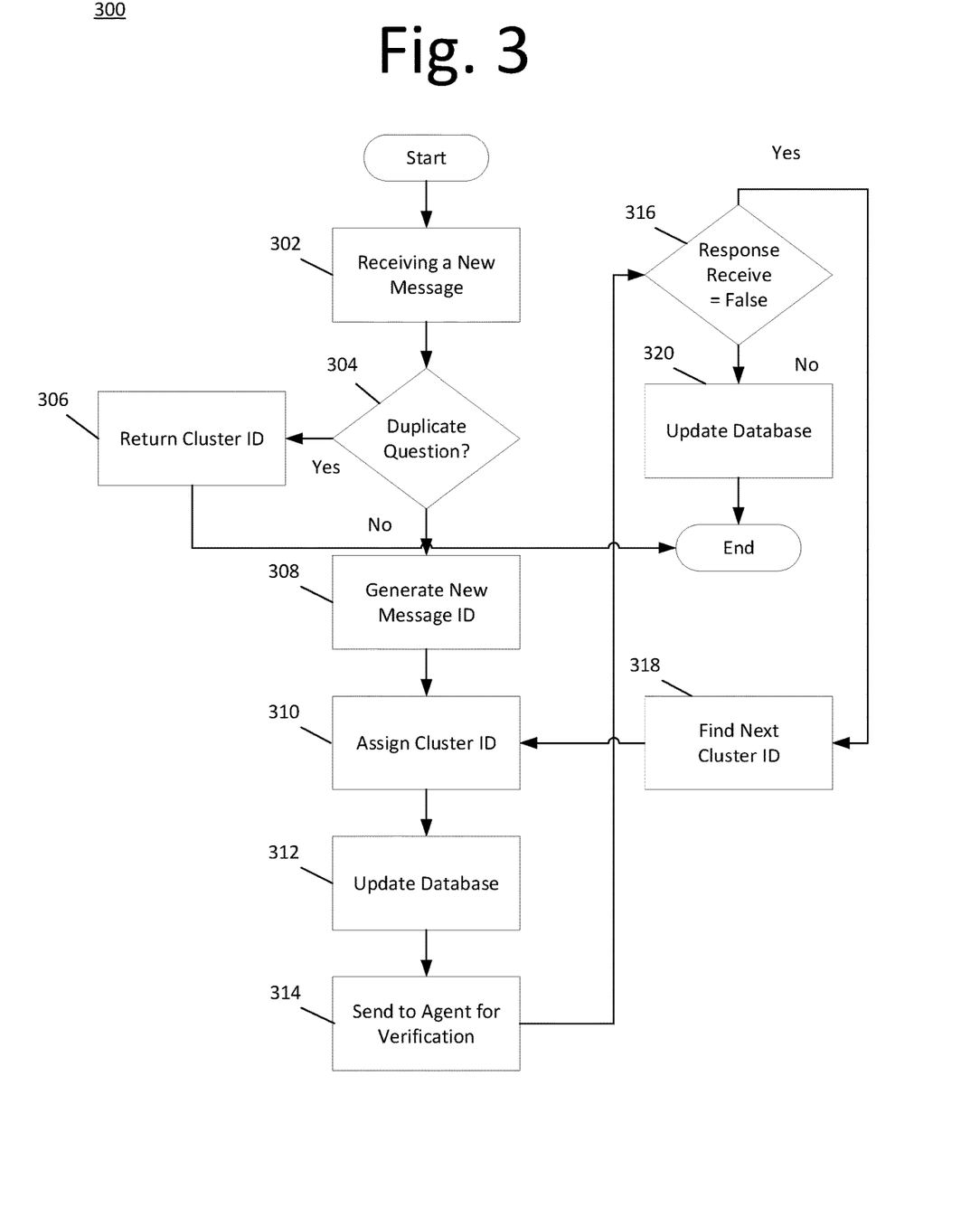
FIG. 3 is a flow diagram illustrating a process for assigning a message to a cluster, according to an embodiment of the present invention.

FIG. 3 is a flow diagram illustrating a process 300 for assigning a message to a cluster, according to an embodiment of the present invention. In some embodiments, process 300 may begin at 302 with a message being received by a ML engine. The ML engine at 304 determines whether the message is a duplicate message. For example, the ML engine may scan each cluster within the cluster database, as well as the messages assigned to each of those clusters. See, for example, FIG. 4 for a more detailed explanation. If a duplicate message is found, ML engine at 306 returns a cluster identification (ID) and updates metrics to the ML API server. Metrics may be defined as the number of times the user asked the questions, the number of times the questions have been received by the system, etc. This may help identify questions that are important to the user.

If, however, the new message is not a duplicate, the routing logic at 308 generates a new message ID for the new message. For example, let's assume there are sixteen messages Q1-Q16 and the new message is not a duplicate of any of the sixteen messages, then the routing logic generates a message ID, such as Q17, for the new message, which is then sent to the clustering agent for clustering. At 310, the clustering engine assigns the new message a cluster ID. This cluster ID may be related to an already existing cluster if there are similar messages, or if there are no similar messages in already existing clusters, then the cluster ID may be related to a new cluster. Essentially, the cluster ID identifies which cluster the message belongs to. At 312, the clustering engine updates the database housing the cluster and message IDs, and at 314, sends the cluster and message IDs to an agent's computing device for approval. In an alternative embodiment, an artificial intelligence (AI) model may learn the clustering database and may approve or deny the cluster and message IDs.

At 316, if the agent returns a response as 'false', then the wrong cluster is predicted, and the process continues at 318 to find the next cluster ID. Otherwise, if the agent returns a response as 'true', then at 320, the clustering engine updates the database. For example, the cluster engine updates the database to show that the agent confirmed the cluster and message IDs.

Although not illustrated, in certain embodiments, agents may merge two clusters to form a single cluster. In those embodiments, all messages from one cluster are inserted into the other cluster. Further, upon insertion of the messages into the other cluster, the old (one) cluster is deleted. See, for example, FIG. 5.

Figure 4:
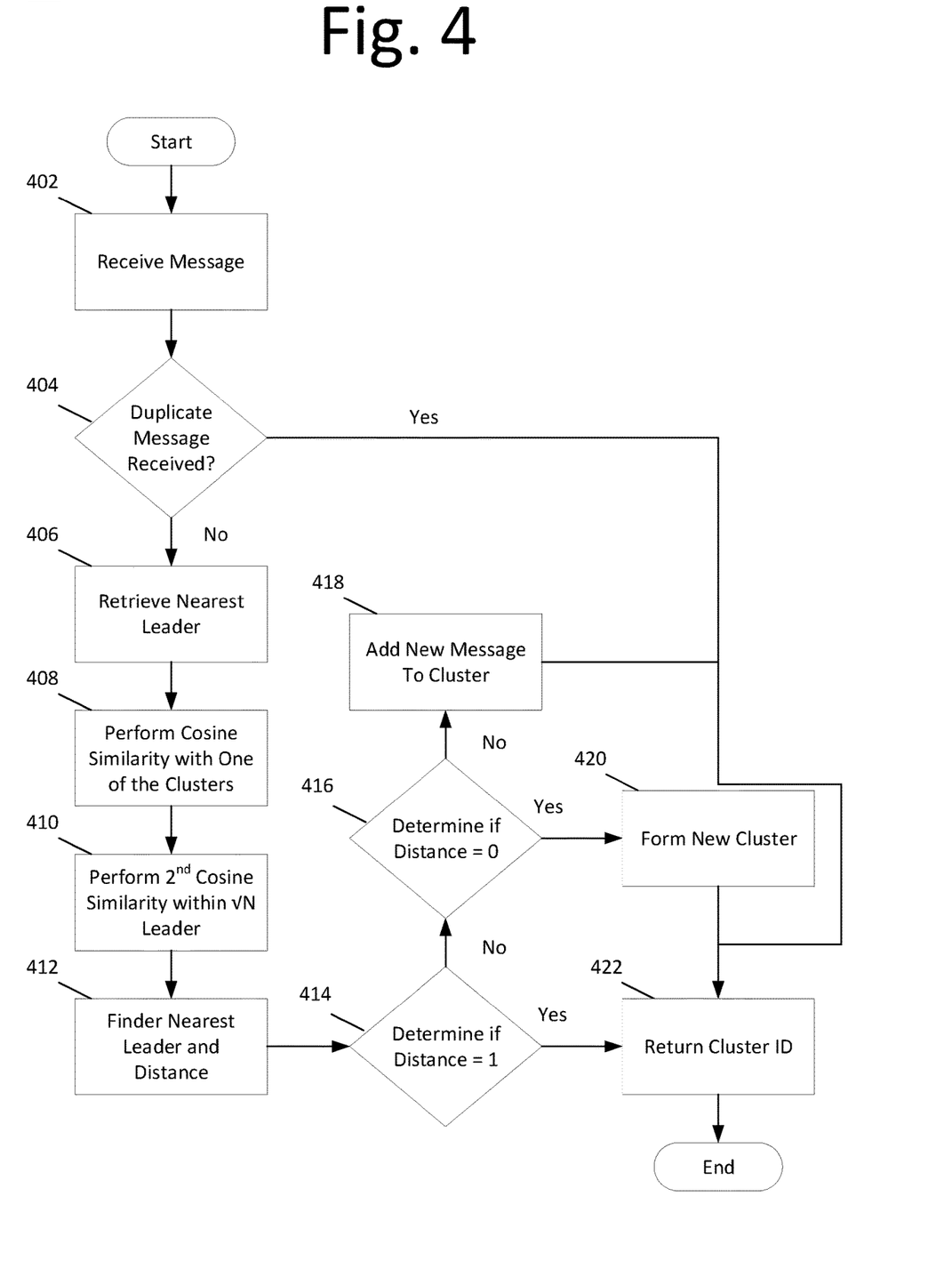
FIG. 4 is a flow diagram illustrating a process for performing clustering, according to an embodiment of the present invention.

FIG. 4 is a flow diagram illustrating a process 400 for performing clustering, according to an embodiment of the present invention. In an embodiment, process 400 begins at 402 with receiving the message by the ML engine. The ML engine at 404 determines if a duplicate message exists in one of the clusters. In some embodiments, JAVA API server asks the ML engine if a duplicate exists, and in response, the ML engine, which includes a logic, determines if a duplicate exists. If the message exists, the ML engine at 422 returns a cluster ID and message ID to the ML API server. If, however, a duplicate message is not found, the ML engine continues to 406.

At 406, ML engine retrieves the nearest leader from $\sqrt{N}$ leader, where N is the total number of messages in the system. Let's say for example that there are 16 messages in the system, N will be 16 with the result of $\sqrt{N}$ leader being 4. In other words, there are 4 leaders in this example.

At 408, the ML engine performs a cosine similarity between the new message and one of the clusters. For example, using the cosine similarity function, a score is assigned between 0 to 1, with 1 meaning that the messages are the same and 0 meaning that the messages are not alike.

At 410, the ML engine performs another cosine similarity to the messages within $\sqrt{N}$ leader. Using the 16 messages as an example, a cosine similarity is performed on $\sqrt{N}$ leader, meaning that the cosine similarity is performed on 4 messages and not the entire set of 16 messages. Continuing with the 16 messages example, there are 4 clusters, each of which may have 4 messages therein. In this example, a cosine similarity is performed on the leader, from which one leader is picked. Within that leader, there may be four questions. For that reason, another cosine similarity is performed only to those four questions. This way, the ML engine avoids performing a cosine similarity to the other 12 questions, which is why the ML engine is precise and fast.

At 412, using the output of the cosine similarity, the ML engine finds the nearest message and distance to the new message. At 414, the ML engine determines if the distance is 1, and if so, the cluster ID for the nearest message is returned at 422. Otherwise, at 416, the ML engine determines if the distance is 0, and if so, a new cluster is formed at 420 and the cluster ID for the new cluster is returned at 422. At 418, if the distance is greater than 0 and less than 1, then the ML engine adds the new message to the cluster and return the cluster ID and the message ID for the new message for the cluster at 422.

Embodiments described above use incremental clustering. Without incremental clustering, it is not feasible to cluster the messages in real time. With millions of messages coming into, and going out of, the system, new messages should be clustered in real time. By performing incremental clustering, the load on the infrastructure is low as the whole system is served from random access memory (RAM). Further, by performing incremental clustering, the load on the central processing unit (CPU) and the memory is avoided.

Figure 5:
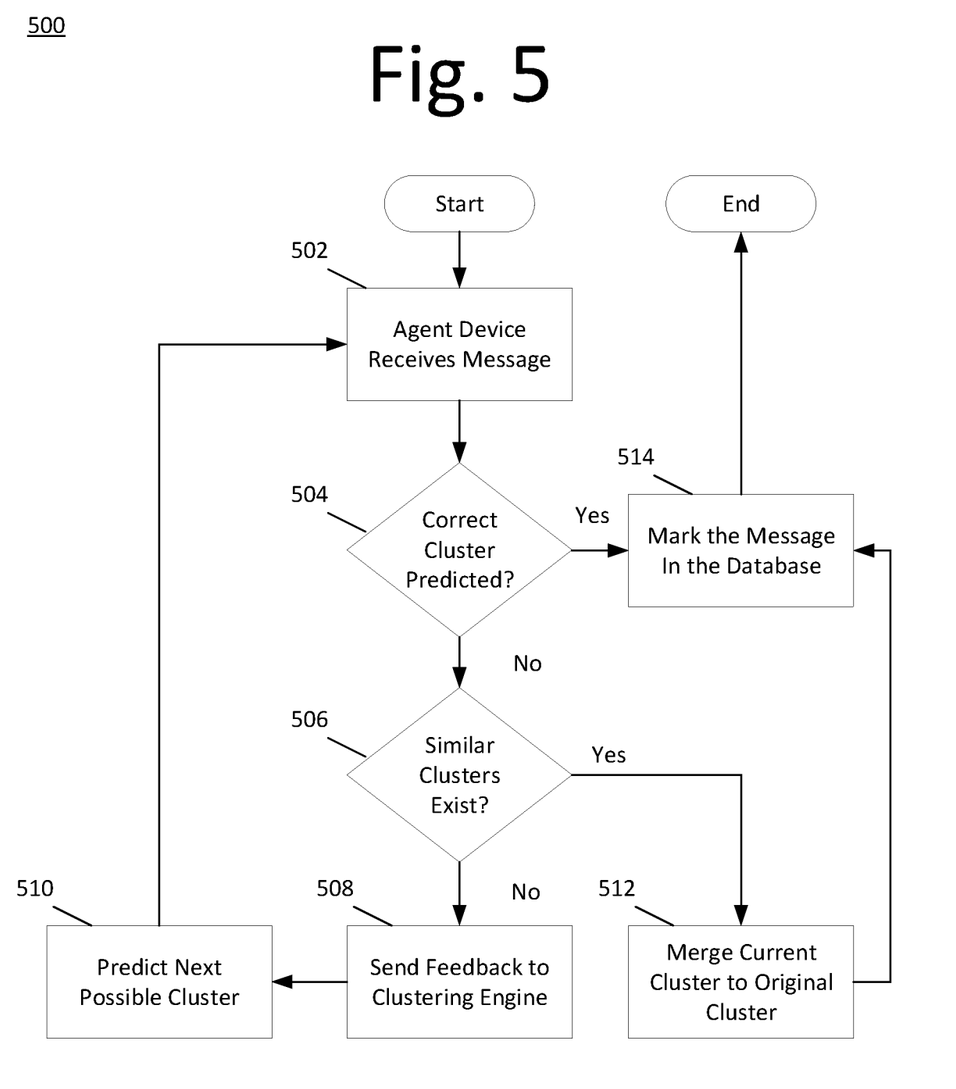
FIG. 5 is a flow diagram illustrating a process for returning feedback of an assigned cluster, according to an embodiment of the present invention.

FIG. 5 is a flow diagram illustrating a process 500 for returning feedback of an assigned cluster, according to an embodiment of the present invention. In some embodiments, process 500 may begin at 502 with an agent device receiving a cluster assignment information regarding the assigned cluster and the message assigned to the cluster. At 504, the agent, using his or her computing (agent) device, checks if the assigned cluster is correctly predicted. If the cluster is correctly predicted, then at 514, the agent marks the message in the database as being correctly identified.

Otherwise, at 506, the process continues to 506 with the ML engine checking if one or more similar clusters exists to that of the assigned (or current) cluster. If a similar cluster exists, the agent merges the current cluster with the original (or similar) cluster at 512. Otherwise, at 508, the agent sends a negative (or false) feedback to the clustering engine, causing the clustering engine at 510 to predict the next possible cluster. In some embodiments, the clustering engine may predict the next possible cluster in the cluster database and send the next possible cluster to the agent (or admin) for feedback (see 502).

Figure 6:
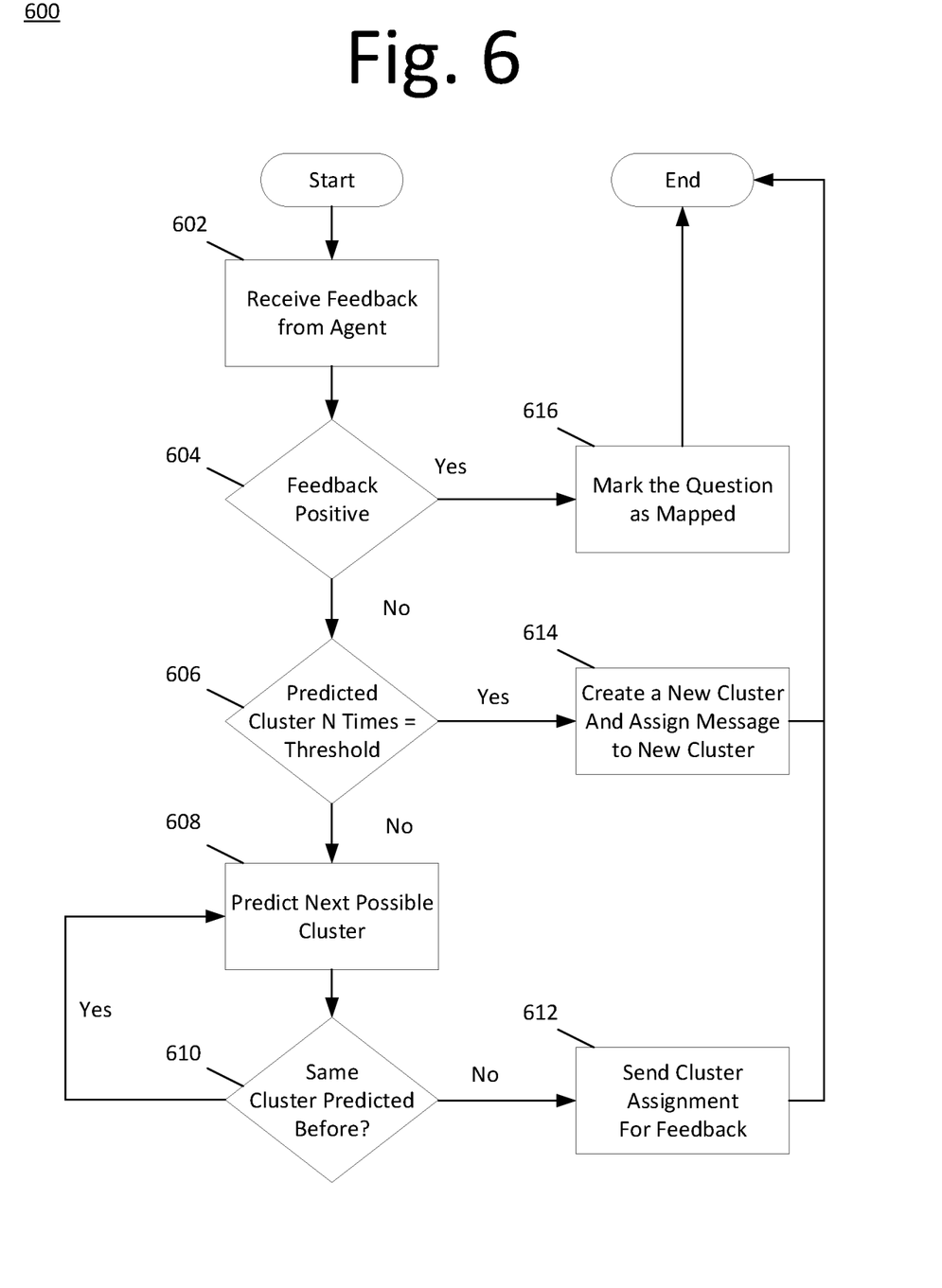
FIG. 6 is a flow diagram illustrating a process for implementing by the clustering engine feedback received from the computing device of the agent, according to an embodiment of the present invention.

FIG. 6 is a flow diagram illustrating a process 600 for implementing by the clustering engine feedback received from the computing device of the agent, according to an embodiment of the present invention. In some embodiments, process 600 may begin at 602 with the clustering engine receiving feedback from an agent. At 604, the clustering engine determines if the feedback was positive or negative. If positive, the clustering engine at 616 marks the message as being mapped. If the feedback is negative, the clustering agent at 606 determines if the cluster was predicted N times before, i.e., the clustering engine checks how many times a negative feedback was received. In some embodiments, after predicting N times (e.g., after a maximum threshold is achieved), the clustering engine creates a new cluster and assign the message to the new cluster at 614.

In another embodiment, in the event that the maximum threshold has not been received, the clustering engine at 608 predicts the next possible cluster. At 610, the clustering engine checks if the next cluster was predicted before, and if so, the process returns to 608; otherwise, the process continues to 612. Depending on the embodiment, to determine if the cluster was predicted before, a database lookup is performed by the clustering engine. At 612, the clustering engine sends the cluster assignment to the agent for feedback.

The process steps performed in FIGS. 3-6 may be performed by a computer program, encoding instructions for the processor(s) to perform at least part of the process(es) described in FIGS. 3-6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) of a computing system) to implement all or part of the process steps described in FIGS. 3-6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for clustering incoming messages, comprising:
   receiving, by a machine learning (ML) engine, an incoming message from an application programming interface (API) server;
   scanning, by the ML engine, a plurality of clusters for one or more messages having similar attributes or features to that of the incoming message, wherein each of the plurality of clusters comprises of the one or more messages, each of which have similar attributes or features to one another;
   retrieving, by the ML engine, a nearest leader from $\sqrt{N}$ leader, where N is a total number of messages in a cluster database and $\sqrt{N}$ leader is a square root of the total number of messages;
   performing, by the ML engine, a cosine similarity between the incoming message and one of the plurality of clusters;
   performing, by the ML engine, a subsequent cosine similarity between incoming message and one or more messages within $\sqrt{N}$ leader to identify a nearest message and a distance between the nearest message and the incoming message; and
   identifying, by a clustering engine, a cluster from the plurality of clusters, wherein the identified cluster comprises the one or more messages similar to that of the incoming message; and
   assigning, by the clustering engine, the incoming message to the identified cluster.

2. The computer implemented method of claim 1, further comprising:
   scanning, by the ML engine, each of the plurality of clusters for one or more messages duplicate to that of the incoming message,
   returning, by the ML engine, a cluster identification to the API server, when a duplicate message to that of the incoming message is found in a cluster database.

3. The computer-implemented method of claim 1, further comprising:
   when the distance between the nearest message and the incoming message is 1, returning, by the ML engine, a cluster identification to the API server.

4. The computer-implemented method of claim 1, further comprising:
   when the distance between the nearest message and the incoming message is 0,
      forming, by the ML engine, a new cluster and assigning the incoming message to the new cluster, and
      returning a cluster identification for the newly formed cluster to the API server, or
   when the distance between the nearest message and the incoming message between 1 and 0,
      adding, by the ML engine, the incoming message to an existing cluster, and
      returning a cluster identification for the existing cluster to the API server.

5. The computer-implemented method of claim 1, further comprising:
   searching, by the ML engine, for one or more similar clusters to that of a current cluster, wherein the current cluster is incorrectly identified; and
   when a similar cluster is identified, notifying, by the ML engine, an agent of the identified similar cluster to merge the current cluster with the identified similar cluster, or
   when a similar cluster is not identified, causing, by the ML engine, the clustering engine to predict a next possible cluster from the plurality of clusters in a cluster database and send the next possible cluster to the agent for feedback.

6. The computer-implemented method of claim 1, further comprising:
   receiving, by the clustering engine, positive or negative feedback from an agent; and
   when the feedback received is positive, marking, by the clustering agent, the incoming message as being mapped, or
   when the feedback received is negative, determining if the cluster being predicted has been predicted a predetermined number of times prior to receiving the negative feedback.

7. The computer-implemented method of claim 6, further comprising:
   when the cluster is predicted for the predetermined number of times, creating, by the clustering engine, a new cluster and assign the incoming message to the new cluster.

8. The computer-implemented method of claim 6, further comprising:
   when the cluster predicted is less than the predetermined number of times, predicting, by the clustering engine, a next possible cluster for the incoming message, and when the predicted cluster is not predicted before, sending, by the cluster engine, cluster assignment information to the agent for feedback, or when the predicted cluster is predicted before, predicting, by the clustering engine, another cluster for the incoming message.

9. An apparatus configured to cluster incoming messages, comprising:

at least one processor; and memory comprising a set of instructions, wherein the set of instructions are configured to cause the at least one processor to execute:

receiving, by a machine learning (ML) engine, an incoming message from an application programming interface (API) server;

scanning, by the ML engine, a plurality of clusters for one or more having messages similar attributes or features to that of the incoming message, wherein each of the plurality of clusters comprises of the one or more messages, each of which have similar attributes or features to one another;

retrieving, by the ML engine, a nearest leader from $\sqrt{N}$ leader, where N is a total number of messages in a cluster database and $\sqrt{N}$ leader is a square root of the total number of messages;

performing, by the ML engine, a cosine similarity between the incoming message and one of the plurality of clusters;

performing, by the ML engine, a subsequent cosine similarity between incoming message and one or more messages within $\sqrt{N}$ leader to identify a nearest message and a distance between the nearest message and the incoming message; and identifying, by a clustering engine, a cluster from the plurality of clusters, wherein the identified cluster comprises the one or more messages similar to that of the incoming message; and assigning, by the clustering engine, the incoming message to the identified cluster.

10. The apparatus of claim 9, wherein the set of instructions are further configured to cause at least one processor to execute:

scanning, by the ML engine, each of the plurality of clusters for one or more messages duplicate to that of the incoming message, returning, by the ML engine, a cluster identification to the API server, when a duplicate message to that of the incoming message is found in a cluster database.

11. The apparatus of claim 9, wherein the set of instructions are further configured to cause at least one processor to execute:

when the distance between the nearest message and the incoming message is 1, returning, by the ML engine, a cluster identification to the API server.

12. The apparatus of claim 9, wherein the set of instructions are further configured to cause at least one processor to execute:

when the distance between the nearest message and the incoming message is 0, forming, by the ML engine, a new cluster and assigning the incoming message to the new cluster, and returning a cluster identification for the newly formed cluster to the API server, or when the distance between the nearest message and the incoming message between 1 and 0, adding, by the ML engine, the incoming message to an existing cluster, and returning a cluster identification for the existing cluster to the API server.

13. The apparatus of claim 9, wherein the set of instructions are further configured to cause at least one processor to execute:

searching, by the ML engine, for one or more similar clusters to that of a current cluster, wherein the current cluster is incorrectly identified; and when a similar cluster is identified, notifying, by the ML engine, an agent of the identified similar cluster to merge the current cluster with the identified similar cluster, or when a similar cluster is not identified, causing, by the ML engine, the clustering engine to predict a next possible cluster from the plurality of clusters in a cluster database and send the next possible cluster to the agent for feedback.

14. The apparatus of claim 9, wherein the set of instructions are further configured to cause at least one processor to execute:

receiving, by the clustering engine, positive or negative feedback from an agent; and when the feedback received is positive, marking, by the clustering agent, the incoming message as being mapped, or when the feedback received is negative, determining if the cluster being predicted has been predicted a predetermined number of times prior to receiving the negative feedback.

15. The apparatus of claim 14, wherein the set of instructions are further configured to cause at least one processor to execute:

when the cluster is predicted for the predetermined number of times, creating, by the clustering engine, a new cluster and assign the incoming message to the new cluster.

16. The apparatus of claim 14, wherein the set of instructions are further configured to cause at least one processor to execute:

when the cluster predicted is less than the predetermined number of times, predicting, by the clustering engine, a next possible cluster for the incoming message, and when the predicted cluster is not predicted before, sending, by the cluster engine, cluster assignment information to the agent for feedback, or when the predicted cluster is predicted before, predicting, by the clustering engine, another cluster for the incoming message.

17. A system configured to cluster incoming messages, comprising:

an application programming interface (API) server configured to receive an incoming message from one or more service application, and route the incoming message for clustering;

a machine learning (ML) module configured to receive the incoming message from the API server, and scan a plurality of clusters for one or more messages having similar attributes or features to that of the incoming message, wherein the plurality of clusters comprise of the one or more messages, each of which have similar attributes or features to one another, wherein the ML module is further configured to retrieve a nearest leader from $\sqrt{N}$ leader, where N is a total number of messages in a cluster database and $\sqrt{N}$ leader is a square root of the total number of messages;

perform a cosine similarity between the incoming message and one of the plurality of clusters, and perform a subsequent cosine similarity between incoming message and one or more messages within $\sqrt{N}$ leader to identify a nearest message and a distance between the nearest message and the incoming message; and a clustering module configured to identify a cluster from the plurality of clusters, wherein the identified cluster comprises the one or more messages similar to that of the incoming message, and assign the incoming message to the identified cluster.

\* \* \* \* \*